J. H. FELMLEE.
WRAPPING MACHINE.
APPLICATION FILED NOV. 18, 1913.
1,113,423.
Patented Oct. 13, 1914.
13 SHEETS—SHEET 4.
Fig. 4.
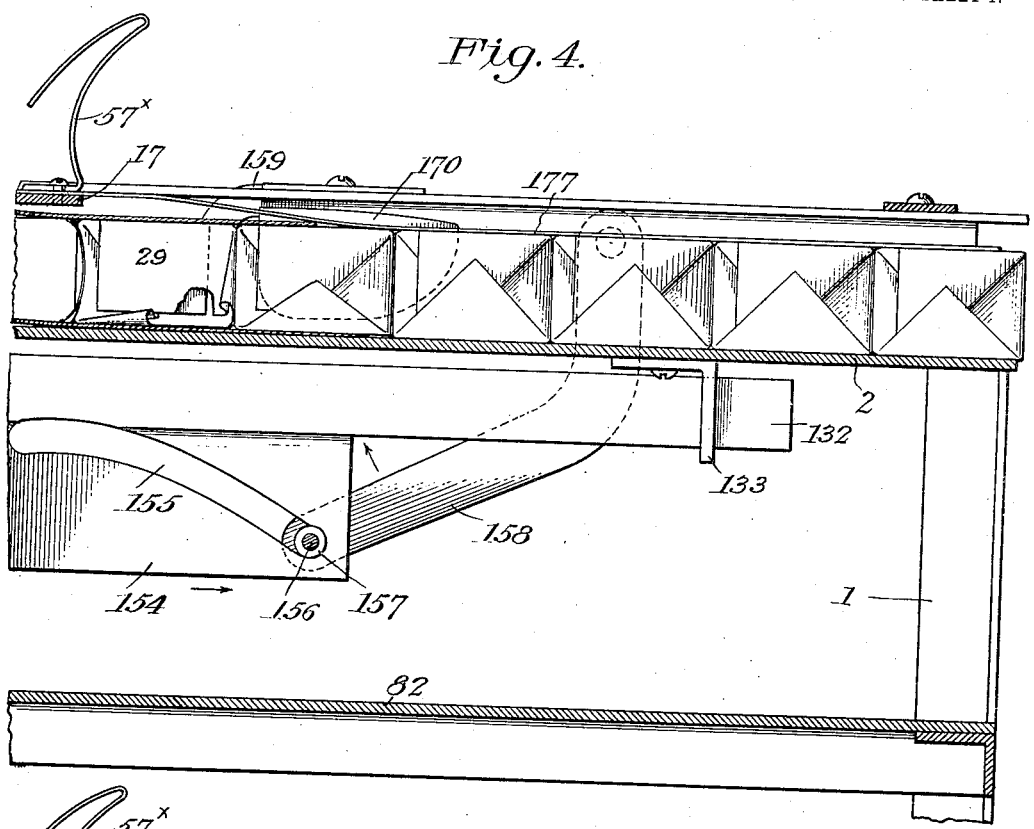
Fig. 4.ᵃ
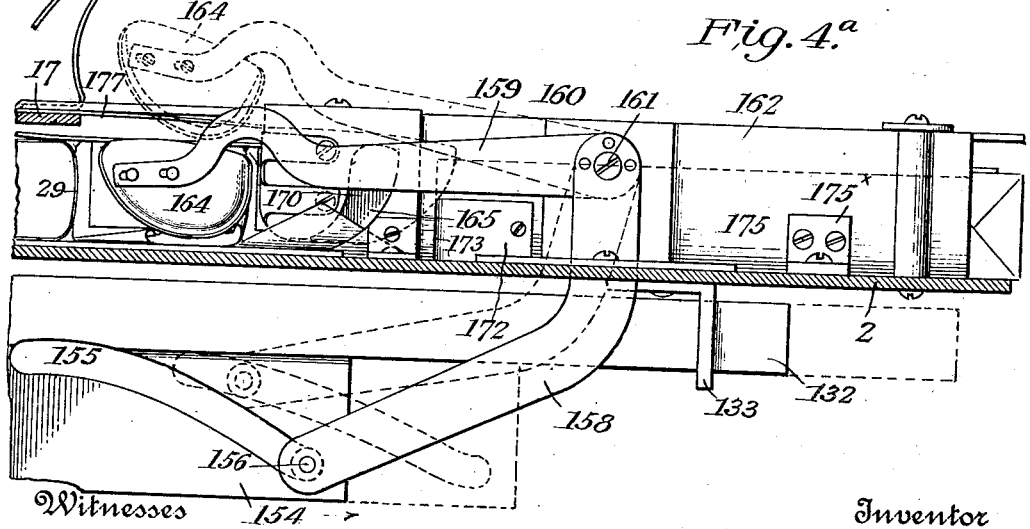
Witnesses
Inventor
John H. Felmlee
Attorneys

J. H. FELMLEE.
WRAPPING MACHINE.
APPLICATION FILED NOV. 18, 1913.

1,113,423.

Patented Oct. 13, 1914.
13 SHEETS—SHEET 5.

Witnesses

Inventor
John H. Felmlee
By
Attorneys

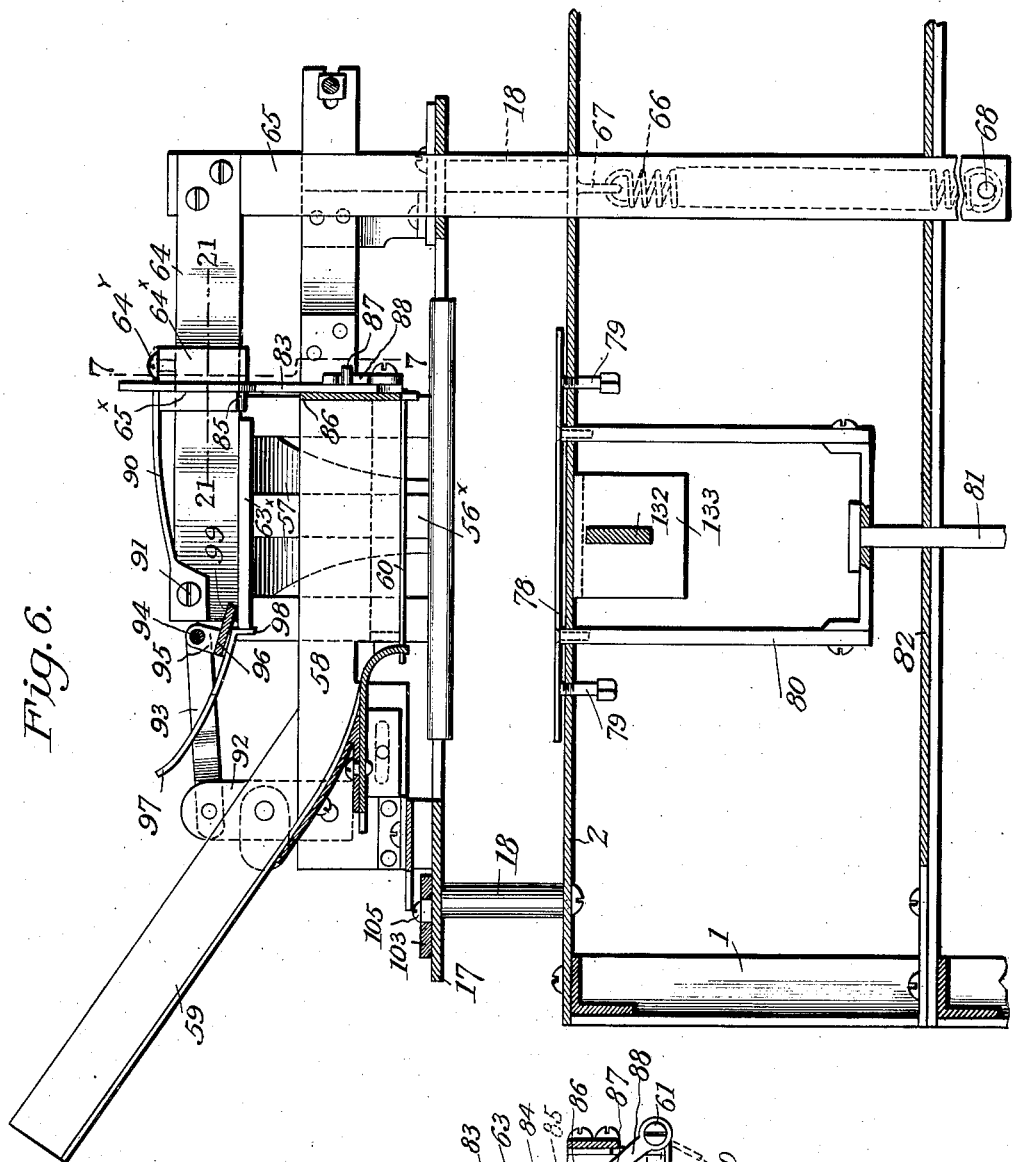

J. H. FELMLEE.
WRAPPING MACHINE.
APPLICATION FILED NOV. 18, 1913.

1,113,423.

Patented Oct. 13, 1914.
13 SHEETS—SHEET 7.

Witnesses
Fenton S. Belt
J. H. Sherwood

Inventor
John H. Felmlee
By Franklin N. Hough
Attorney

J. H. FELMLEE.
WRAPPING MACHINE.
APPLICATION FILED NOV. 18, 1913.
1,113,423.
Patented Oct. 13, 1914.
13 SHEETS—SHEET 10.
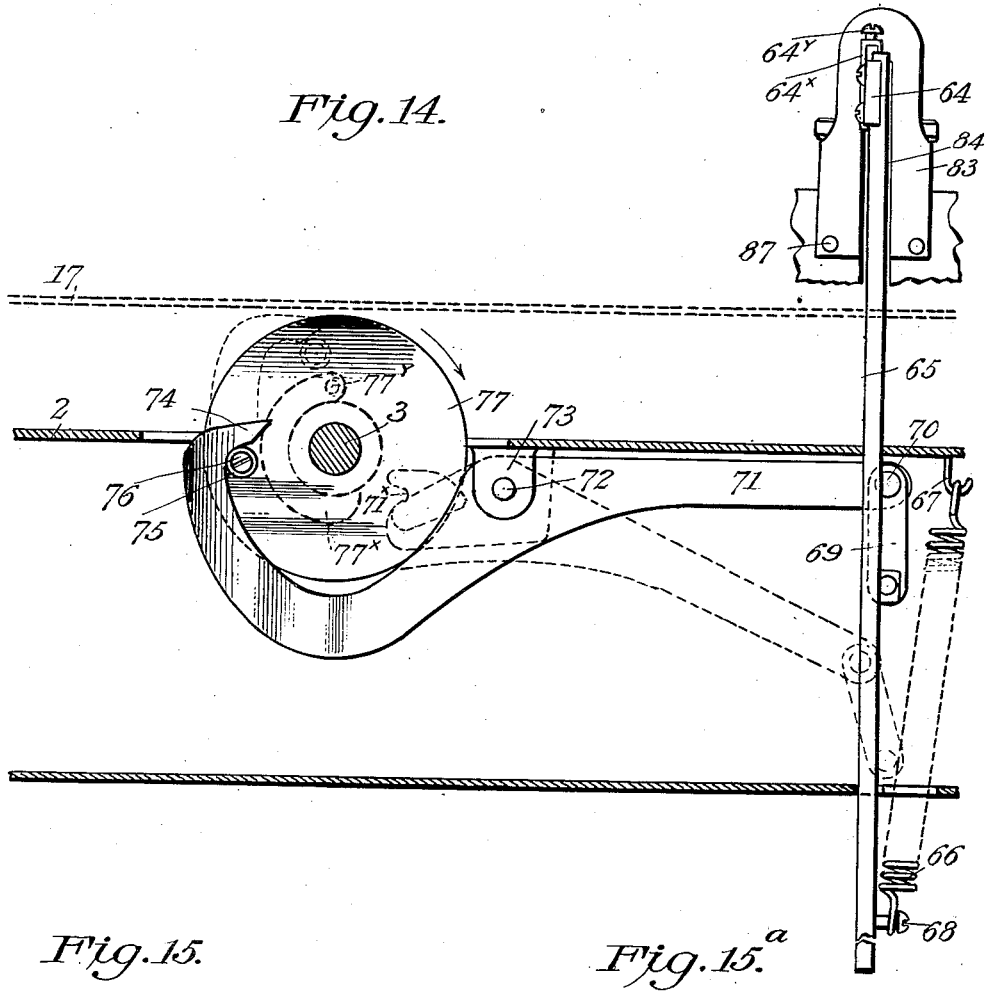
Fig. 14.
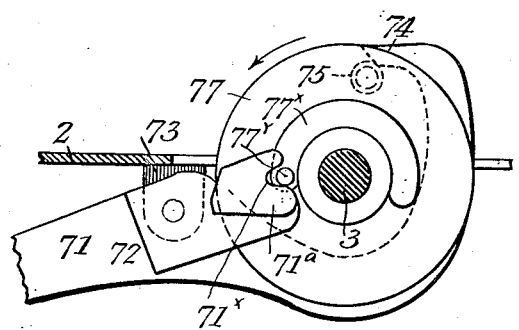
Fig. 15.
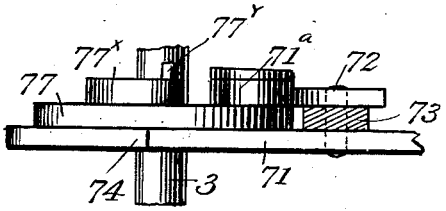
Fig. 15.ᵃ
Witnesses
J. N. Sherwood
A. R. Fowler
Inventor
John H. Felmlee
By Franklin H. Hough
Attorney

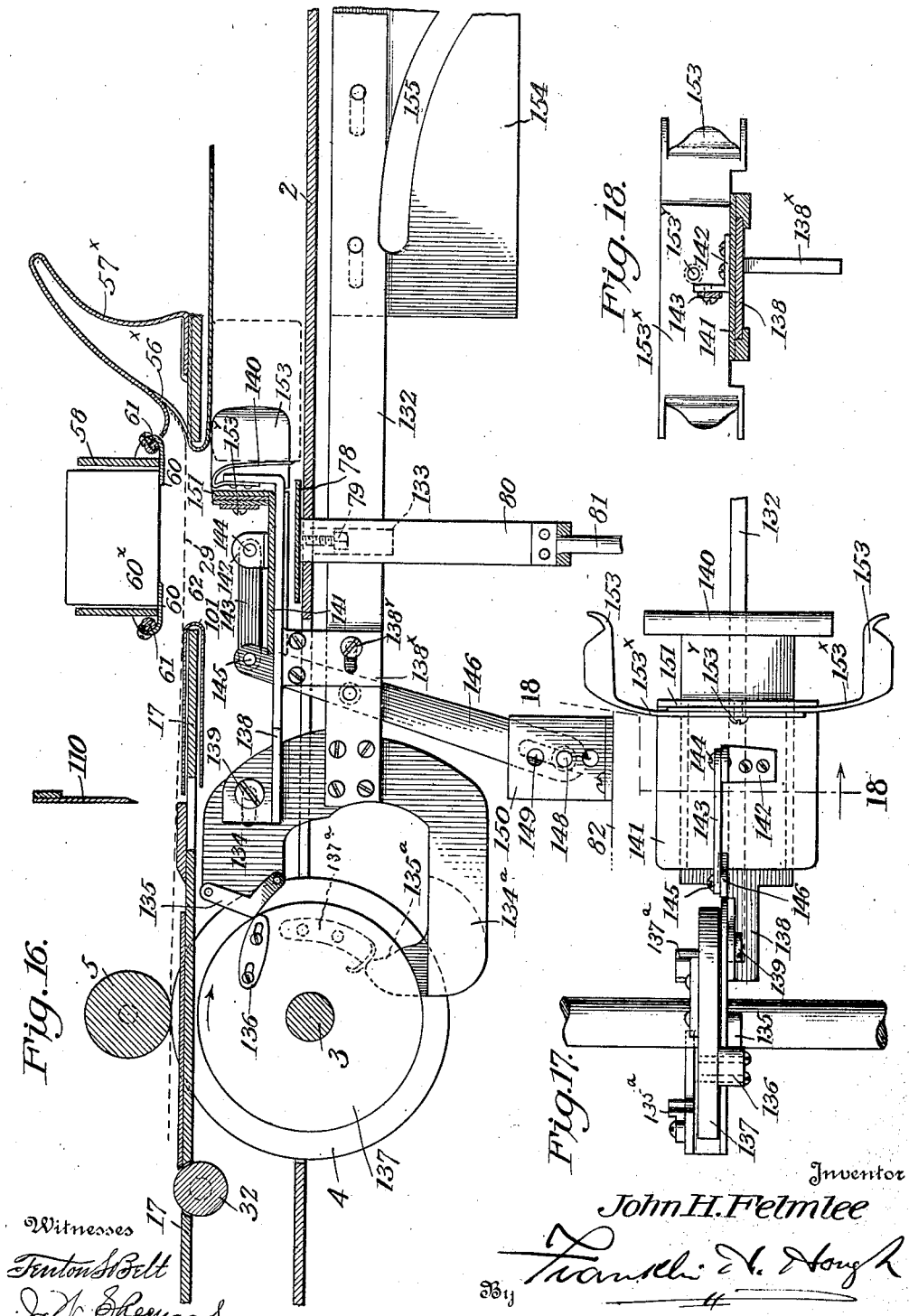

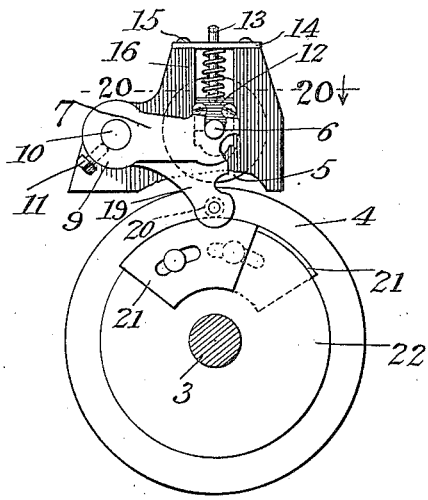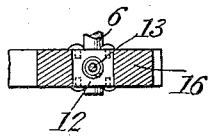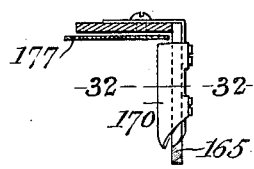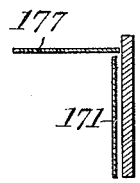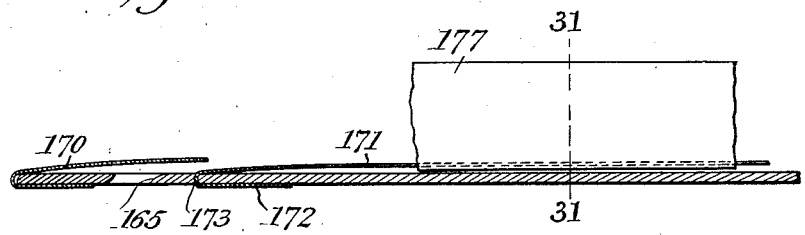

J. H. FELMLEE.
WRAPPING MACHINE.
APPLICATION FILED NOV. 18, 1913.
1,113,423.
Patented Oct. 13, 1914.
13 SHEETS—SHEET 13.
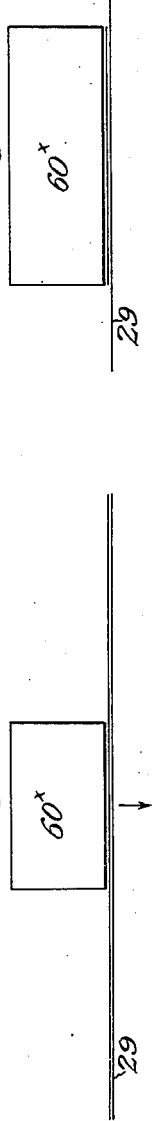
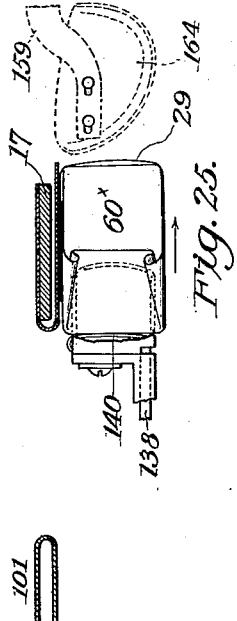
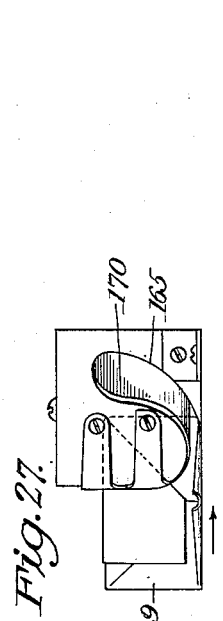
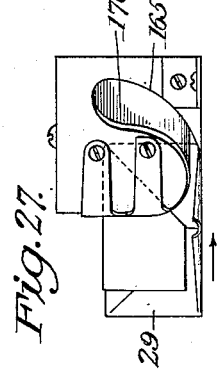
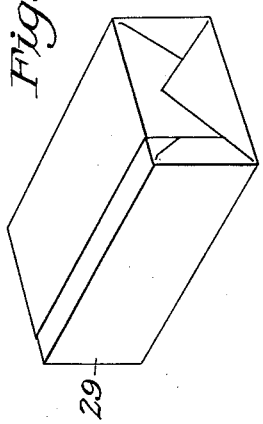
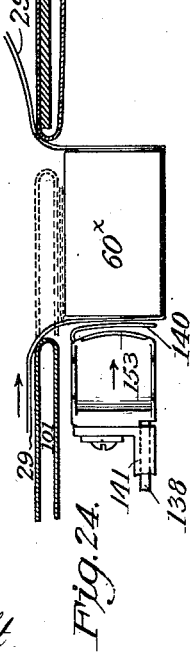
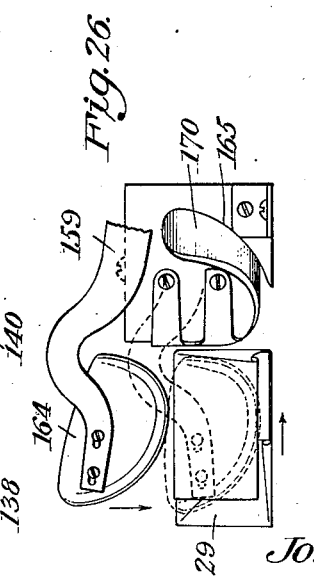
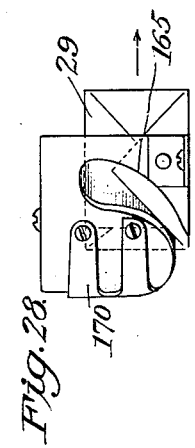
Witnesses
Inventor
John H. Felmlee
By
Attorney

UNITED STATES PATENT OFFICE.

JOHN H. FELMLEE, OF WHEELING, WEST VIRGINIA, ASSIGNOR, BY DIRECT AND MESNE ASSIGNMENTS, TO THE PROGRESSIVE MANUFACTURING COMPANY, OF WHEELING, WEST VIRGINIA, A CORPORATION.

WRAPPING-MACHINE.

1,113,423.    Specification of Letters Patent.    Patented Oct. 13, 1914.

Application filed November 18, 1913.   Serial No. 801,700.

*To all whom it may concern:*

Be it known that I, JOHN H. FELMLEE, a citizen of the United States, residing at Wheeling, in the county of Ohio and State of West Virginia, have invented certain new and useful Improvements in Wrapping-Machines; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in apparatus for wrapping articles of various kinds and comprises a simple and efficient automatic means of this nature having various details of construction and combinations and arrangements of parts which will be hereinafter fully described, shown in the accompanying drawings and then specifically defined in the appended claims.

My invention is illustrated in the accompanying drawings, in which:—

Figure 1:
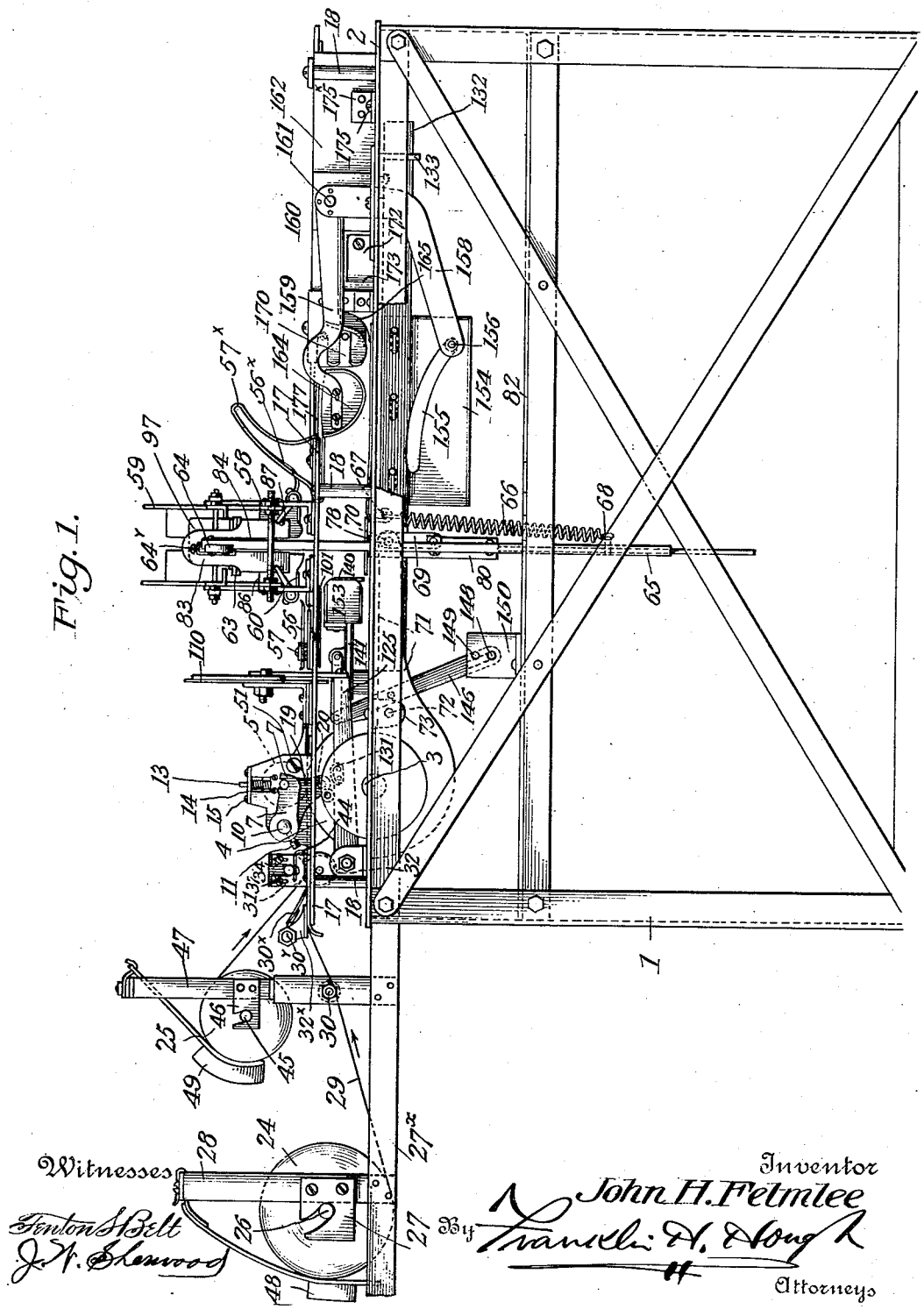
Figure 2:
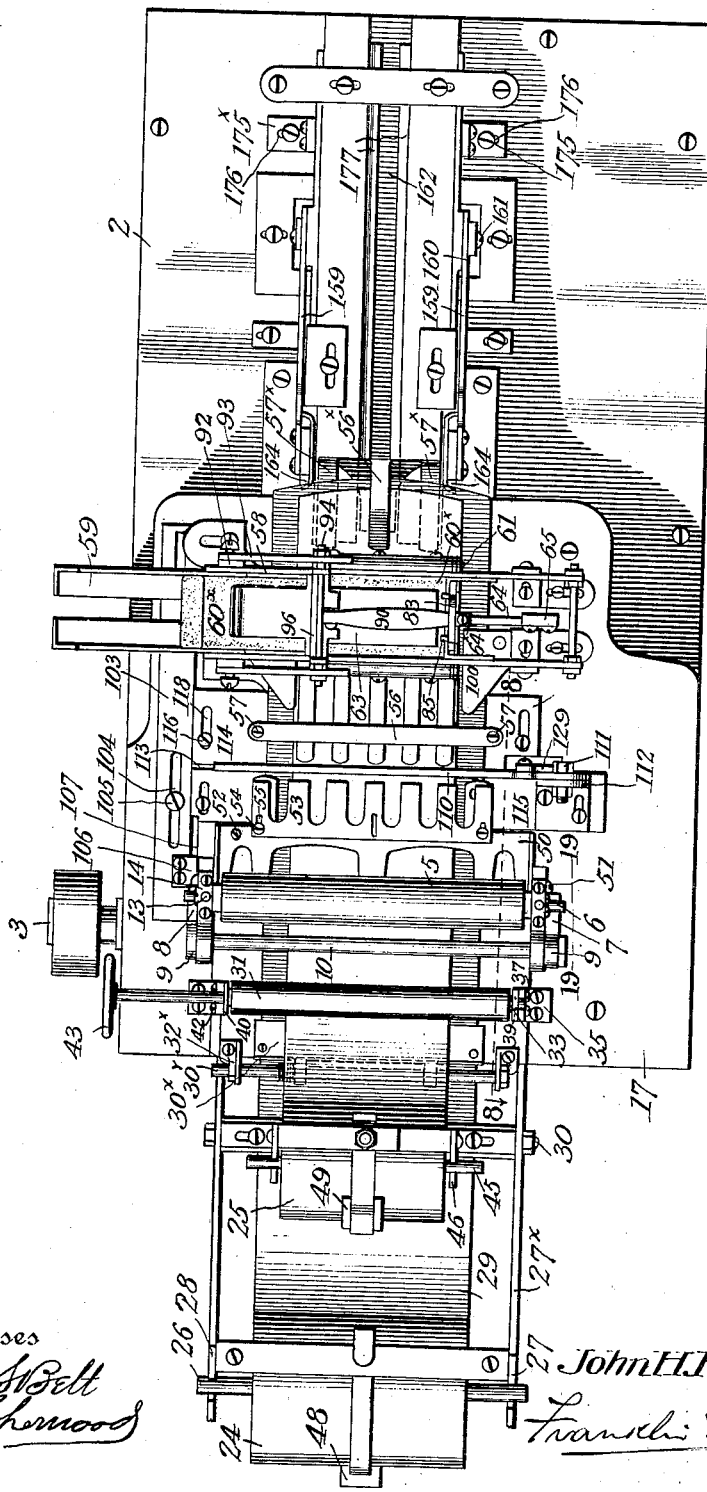
Figure 3:
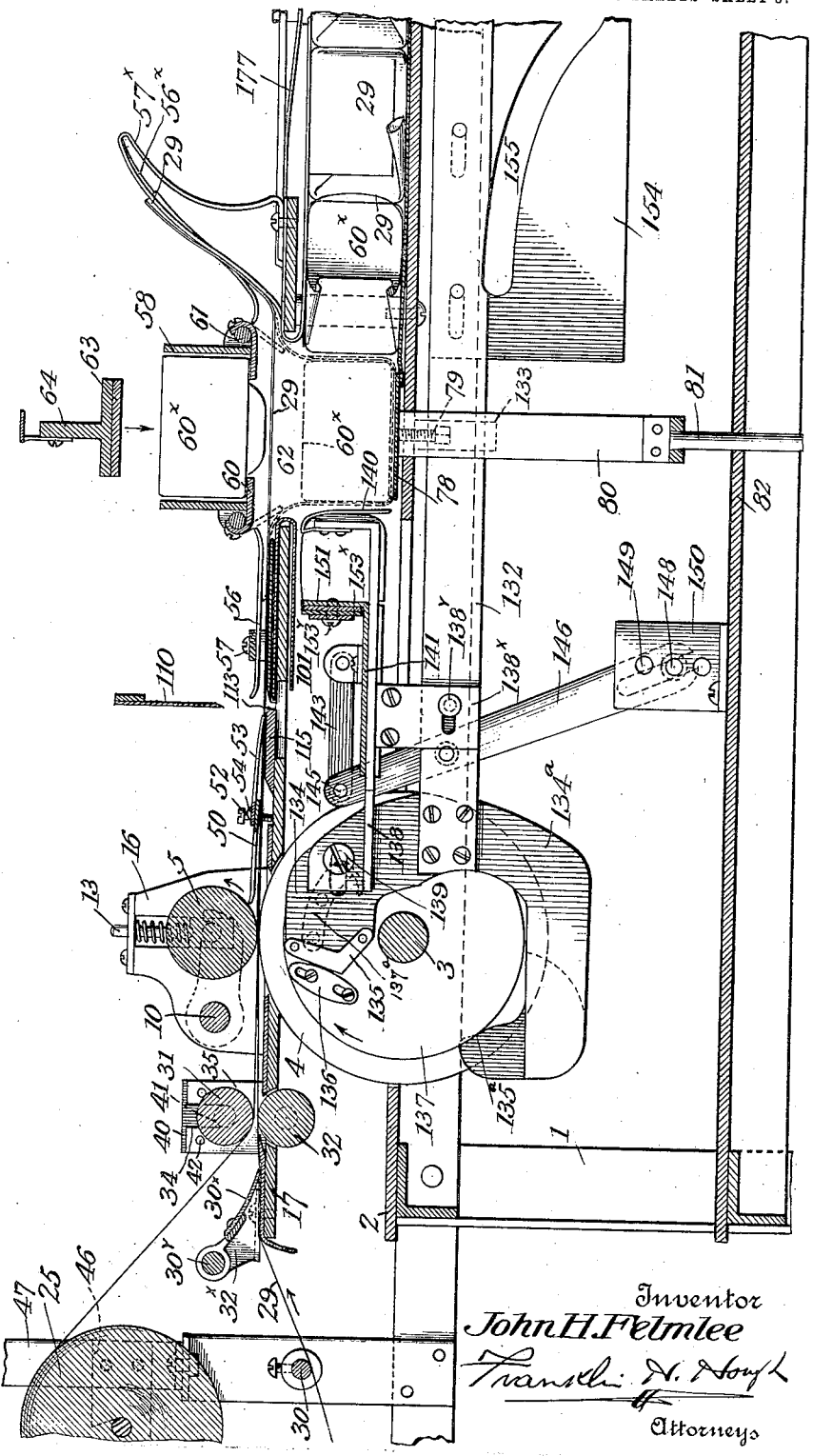
Figure 5:
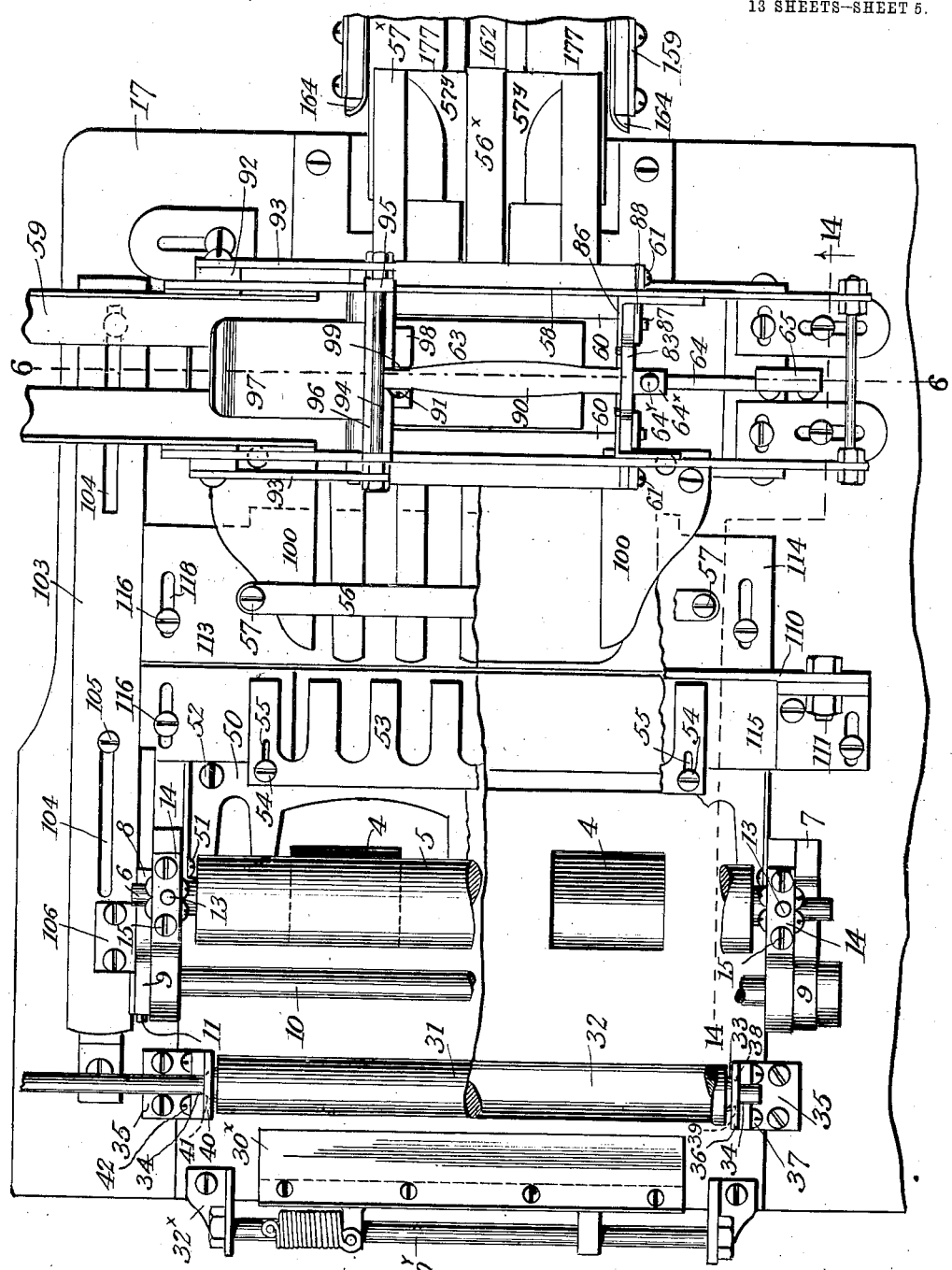
Figure 8:
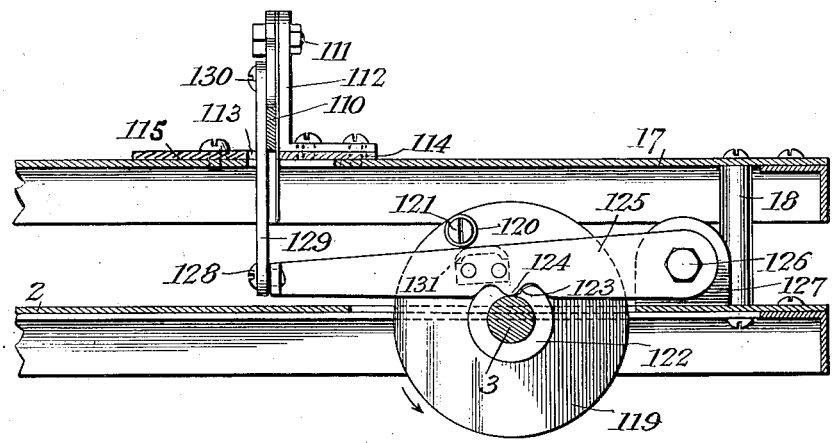
Figure 9:
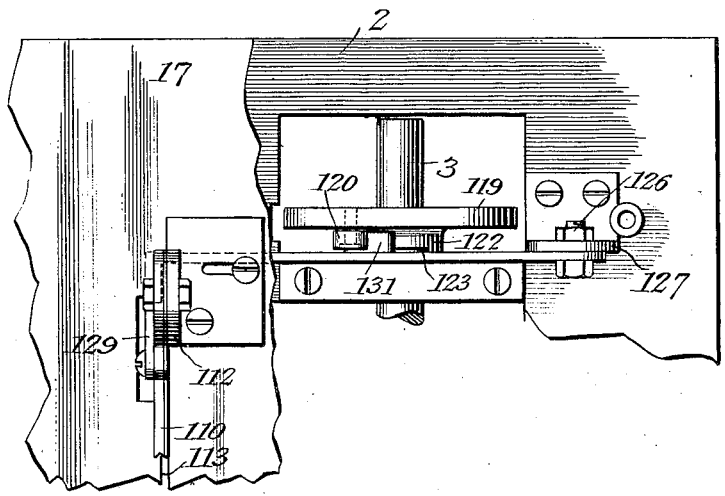
Figure 10:
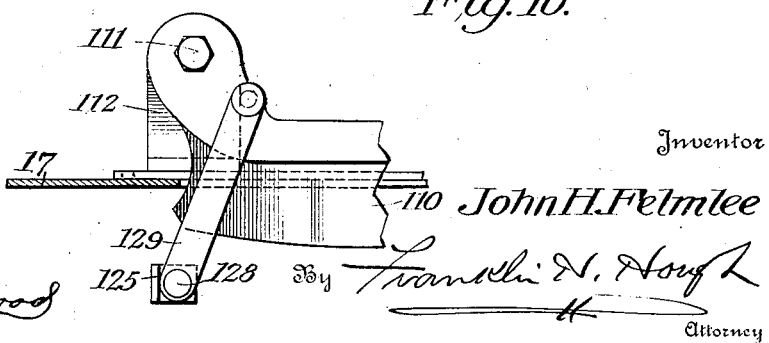
Figure 11:
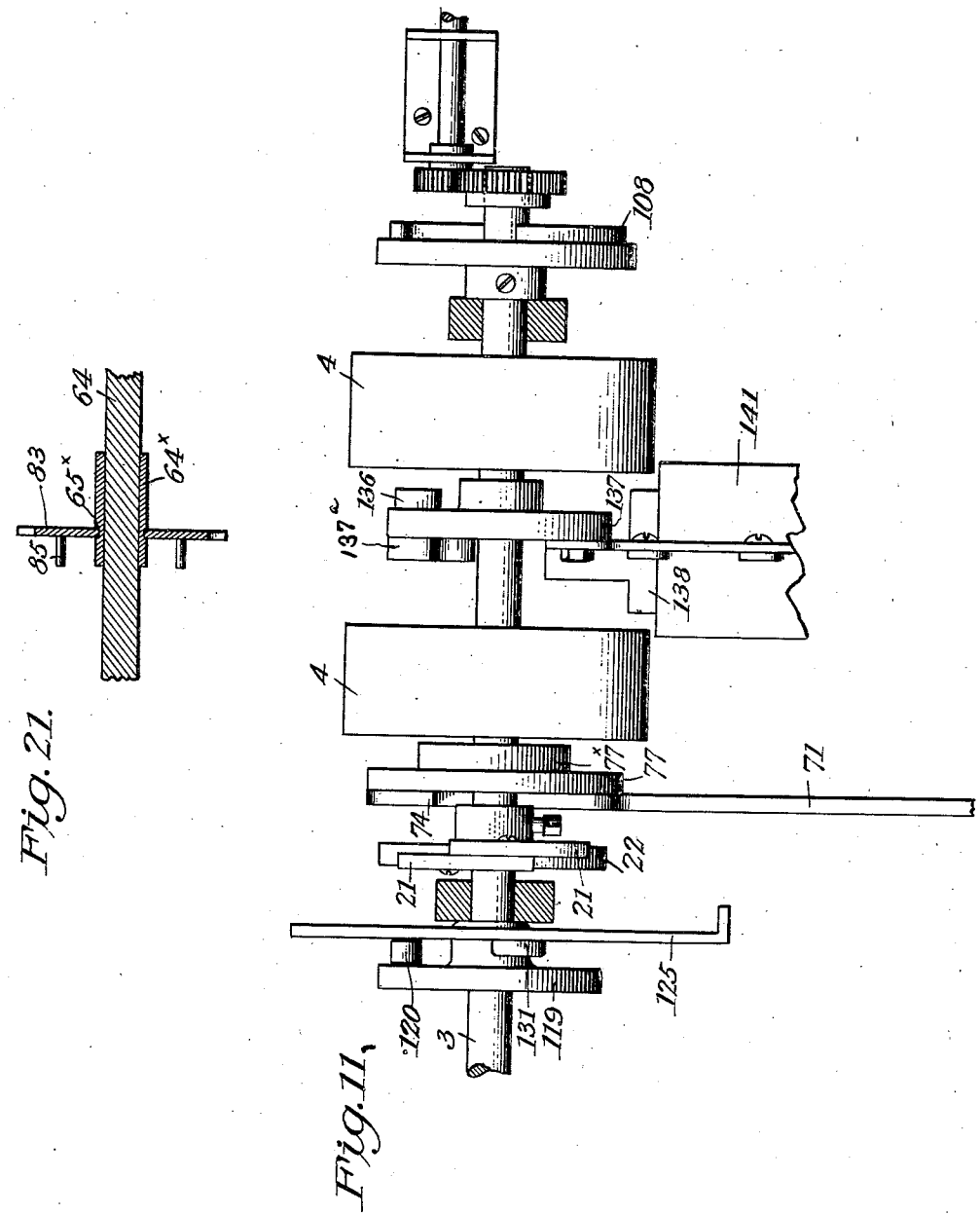
Figure 12:
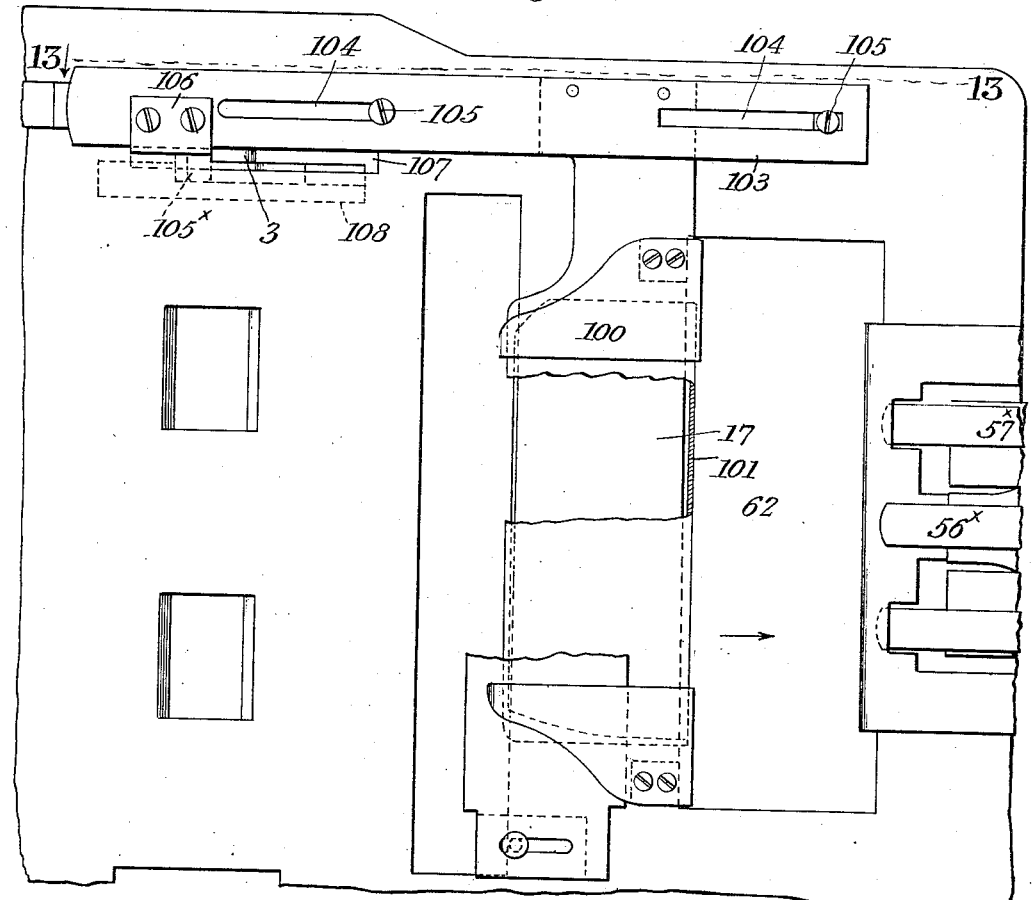
Figure 13:
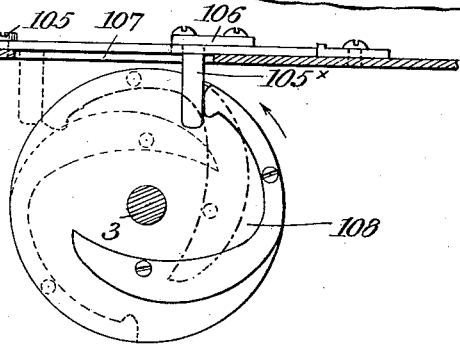

Figure 1 is a side elevation of the apparatus. Fig. 2 is a top plan view. Fig. 3 is a central longitudinal sectional view through a part of the apparatus. Fig. 4 is a central sectional view through the delivery end of the machine. Fig. 4ª is a side elevation of the delivery end of the machine. Fig. 5 is an enlarged top plan view of a portion of the machine. Fig. 6 is a sectional view on line 6—6 of Fig. 5. Fig. 7 is a sectional view on line 7—7 of Fig. 6. Fig. 8 is a sectional view on line 8—8 of Fig. 2. Fig. 9 is a top plan view of the table of the machine, a portion being cut away to better illustrate parts of the apparatus. Fig. 10 is a detail sectional view showing a portion of the knife in elevation. Fig. 11 is a top plan view of the main power shaft and cams showing the friction paper feeding rolls and parts being in section. Fig. 12 is a top plan view of a portion of the table and paper guiding and folding mechanism. Fig. 13 is a sectional view on line 13—13 of Fig. 12. Fig. 14 is a detail in elevation taken on line 14—14 of Fig. 5. Fig. 15 is a similar sectional view showing the opposite side of the cam. Fig. 15ª is a top plan view of Fig. 15. Fig. 16 is a sectional view similar to Fig. 3, showing the parts in their forward operative positions. Fig. 17 is a top plan view of a detail of the plunger and means for actuating the same for moving the parcel forward. Fig. 18 is a detail sectional view on line 18—18 of Fig. 17. Fig. 19 is a sectional view on line 19—19 of Fig. 2. Fig. 20 is a sectional view on line 20—20 of Fig. 19. Fig. 21 is a sectional view on line 21—21 of Fig. 6. Figs. 22, 23, 24, 25, 26, 27, 28 and 29 are detail views showing the different positions that the wrapper assumes from the time it receives the parcel to its completed wrapped state, and Figs. 30, 31 and 32 are detail sections through the delivery end of the machine.

Reference now being had to the details of the drawings by numerals, 1 designates the frame of the apparatus which may be of any suitable material, having a table top 2, and 3 designates an operating shaft mounted in suitable bearings adapted to be driven by any suitable power. Said shaft has keyed thereto the paper feeding wheels 4, two of which are shown in the drawings (see Fig. 11) and which are spaced apart and of any suitable diameter. Said rollers coöperate with a spring-pressed roller 5, the spindle ends 6 of which are journaled in bearings in the elbow member 7 at one end and an arm 8 at the other, each of which has a boss 9 held in an adjusted position upon the shaft 10 by set screws 11. Boxings 12, each having an integral pin 13 projecting therefrom, rest upon the spindle ends 6 of the roller and bars 14 are held by screws 15 upon the pillar plates 16 which are supported by the top plate 17 mounted upon the posts 18 which rest upon the table 2. Said elbow member 7 is provided with an arm 19 carrying an anti-friction roller 20 which is disposed in the path of the adjacent cam members 21 which are mounted upon the disk 22 keyed to the shaft 3. By the provision of these adjustable cams upon the disk 22, means is provided whereby at each revolution of the shaft said cam members may contact with the antifriction roller 20 and cause the feeding roller 5 to be raised out of frictional contact with the paper, thus allowing the paper to be at rest at an interval during the wrapping process.

The reels of paper, there being two shown in the drawings, are illustrated by numerals 24 and 25, the former of which has spindle ends 26 which are journaled in the plates 27 fastened to the standards 28 upon an extension 27$^x$ of the table. The sheet of paper, designated by numeral 29, as it unreels passes underneath the rod 30 thence underneath the spring-pressed plate 30$^x$ which is hinged to the rod 30$^y$ carried by the bracket arms 32$^x$ and which plate 30$^x$ tends to hold the wrapping paper from wrinkling and steady the same as it is fed forward. The wrapping paper thence passes forward to the two rollers 31 and 32, the latter of which is journaled in stationary bearings while one end of the roller 31 has a conical projecting part 33 about its spindle, said spindles being journaled in the recesses 34 formed in the upright standards 35 upon the top plate 17.

A plate, designated by numeral 36, is adjustably held upon one of said standards 35 by means of set screws 37 passing through slots in the standard and said plate 36 has a recess 38 formed in the lower edge thereof and the edge of the recess is beveled as at 39, forming a contact surface against which the conical-shaped projection upon the roller is adapted to bear as an end thrust is given to said roller 31. A similar plate, designated by numeral 40, is fastened to the other of the standards in which the roller 31 is mounted and has a recess 41 fitting over the spindle end of the shaft and which plate is also adapted to be held in adjusted positions by means of set screws 42.

A hand wheel, designated by numeral 43, is fastened to the projecting spindle end of said roller 31 and forms a convenient means whereby an inner longitudinal movement may be imparted to the roller when it is desired to cause the latter to be thrown into such a position as to coöperate with the under roller 32 to adjust the paper back or forward as may be necessary. Springs, designated by numeral 44, are provided which bear against the spindle ends of the roller 31 and tend to hold the roller suspended a slight distance, sufficient to allow the roller to permit the paper to move freely underneath the same during the operation of the folding process.

The second reel of wrapping paper is provided with spindle ends 45 which are journaled in the bracket plates 46 upon the standard 47 and the paper from the reel 25 is adapted to be fed between the rollers 31 and 32, thence forward to the wrapping part of the apparatus. Weights, designated by numerals 48 and 49, bear against the reels 24 and 25 and serve as tension means to prevent the reels from unwinding surplus paper during the operation of the apparatus.

Referring to Fig. 2 of the drawings, it will be seen how the paper advances forward to receive the package to be wrapped and in which view a guide plate 50 is shown, pivotally mounted upon the pins 51 carried by the pillar block, and a screw 52 is mounted in threaded openings in said guide plate 50 and adapted to bear against the top 17 and to regulate the distance intermediate said guide plate and the top and which plate should be adjusted to guide the paper close to the top as it is fed forward.

An extension rack 53 is held in adjusted positions upon the guide plate 50 by means of the set screws 54 which pass through slots 55, said extension plate serving as a means to further guide the paper as it is fed forward to a location where the paper is severed by a knife and which will be presently described. Another guide rack is shown in Fig. 2 of the drawings and is designated by numeral 56 and which is provided with apertured ends for the reception of the set screws 57.

Projecting from the upper surface of the top 17 is an inclined plate 57$^x$ with slots 57$^y$ upon either side of a central finger 56$^x$ and which plate with its curved finger 56$^x$ is adapted to receive the wrapping paper as it is fed forward, the paper passing under said finger and which tends to prevent the wrapping paper from curling up and catching upon objects when the paper is being fed through in position to receive the article to be wrapped.

Referring to Fig. 3 of the drawings will be seen a boxing 58, with open top and bottom, into which the articles to be wrapped are fed in any suitable manner, as by means of a chute 59, shown clearly in Fig. 6 of the drawings, and which boxing is provided with shelves 60 fixed to rock shafts 61 journaled on the outside of said boxing, said shelves extending into the interior of the latter and the bottom and upon which the article 60$^x$ to be wrapped is temporarily supported before being deposited upon the wrapping papers beneath.

Directly underneath the boxing is an opening 62 into which the article to be wrapped with the paper beneath it is deposited by means of a plunger 63 which is fastened to a bar 64 which in turn is held in any suitable manner to the vertically adjustable bar 65. Said bar 65 is guided in its longitudinal movements by the walls of the slots in the frame of the apparatus, as shown in Fig. 6 of the drawings, and a spring, designated by numeral 66, is fastened to a hook 67 upon the under side of the table top and also to a pin 68 upon said bar, which spring is provided for the purpose of relieving the weight of the plunger from the dog which will be presently described and which is provided for the purpose of raising the plunger. Pivotally connected to said bar 65 is a link 69 which in turn is pivotally connected at 70 to one end of the tilting lever 71, a detail of which lever is shown in Fig. 14 of the drawings, and which lever is pivotally mounted upon a pin 72 held in an aperture in the lugs 73 projecting from the lower surface of the table top. Said lever 71 has a curved arm terminating in a hooked end 74, shown clearly in Fig. 14 of the drawings, and which is adapted to be engaged by an antifriction roller 75 journaled on the pin 76 projecting from the face of a disk 77 which is keyed to the driving shaft 3. It will be noted upon reference to said Fig. 14 that, by the peculiar shape of the curved end of the lever 71, the antifriction roller 75 is allowed to move a certain distance in its revolution without coming in contact with the inner curved edge of the lever but, when said antifriction roller contacts with the hooked end 74, it will cause the lever to tilt from the position shown in solid lines in Fig. 14 to that shown in dotted lines and in which tilting movement the lever will move without interference with the shaft 3. As the lever 71 tilts, the vertically disposed bar 65, which is fastened to the plunger, will draw the latter down, forcing the article to be wrapped down into the recess 62 with the wrapper underneath it and upon the adjustable bottom 78 (shown in Figs. 1, 3 and 16) which may be held in adjusted positions by means of the set screws 79 which regulate the thickness of the article to be wrapped.

Projecting from the face of the disk 77, opposite from the face upon which the antifriction roller 74 is mounted, is a semicircular cam-shaped projection 77$^x$ from which, near one end thereof, a pin 77$^y$ projects which is adapted to engage a slot 71$^x$ formed in an offset portion 71$^a$ of the lever 71, serving to positively hold the bar 65 from moving in either direction when the pin is thus interlocked in the slot. Simultaneously with the engagement of the pin with said slot, the end of the cam 77$^x$ will strike the offset 71$^a$ adjacent to the slot in the arm of the lever 71 and said cam and pin moving together will impart a positive upward movement to the bar 65 through the connection in the lever therewith, returning the bar to its normal upright position. Said cam 77$^x$ also serves to positively hold the plunger which is connected to the bar 65 to its highest limit until such a moment as the apparatus is adapted to actuate the plunger to force the article to be wrapped down upon the wrapper. Said bottom 78 is fastened to a rack 80, the lower end of which has connected thereto a rod 81 which is guided in its longitudinal movements in an aperture in the crosspiece 82, forming a part of the frame of the apparatus.

Referring to Figs. 1, 6 and 7 of the drawings will be seen a vertically adjustable yoke, designated by numeral 83, having a longitudinal slot 84 therein, in which the horizontally disposed bar 64 and a collar 64$^x$, held thereto by means of a set screw 64$^y$, have a play. Said collar 64$^x$ has slots 65$^x$ formed in the opposite edges thereof (shown clearly in Fig. 21) in which the edges of the slot in the yoke 83 are guided and which slots prevent a lateral movement of the yoke 83. It will be understood that the collar 64$^x$ may be held in different adjusted positions upon the bar 64 and also the yoke 83 adjusted to different positions accordingly as it may be desired to adapt the apparatus to wrap parcels of different sizes. Said yoke 83 is provided with laterally projecting pins 85 which are adapted to support the plate when the plunger is moving downward by said pins coming against the upper edges of the crosspiece 86 of the boxing in which the article to be wrapped is deposited, thereby holding the plate out of the way of the paper while the paper is being fed underneath the boxing to receive the article to be wrapped. Other pins, designated by numeral 87, project from the opposite side of the plate, as shown in Fig. 6 of the drawings, and which are adapted to engage underneath the arms 88 which are fixed, one to corresponding ends of each rock shaft 61, thus forming a means for throwing and holding the article in the position shown in Fig. 3 to support the article to be wrapped before it is moved to its position within the opening 62 where the initial folding operation is performed. As the horizontally disposed bar 64 rises, the collar 64$^x$ will contact with the end of the spring 90 and cause the yoke to be raised to its highest position. Said spring 90 is fastened at one end by means of the screw 91 to the horizontally disposed bar 64, the purpose of said spring 90 being to cushion the movement of the plate and tend to insure its being elevated to its highest limit and insure the shelves being held in horizontal position.

Pivotally mounted upon the standards 92 of the framework are the bars 93, shown clearly in Fig. 6, and which carry a shaft 94 at their forward ends and upon which the angled ends 95 of the cross bar 96 are journaled and to which cross bar the plate 97, having its inner end 98 bent downwardly at an angle, as shown in Fig. 6, is fastened and which crosspiece has a notch 99 formed in its free edge to receive the end of the horizontally disposed bar 64. The downwardly extending portion 98 of said plate is adapted to engage over the edge of the lower end of the article to be wrapped to positively hold the article from moving into position to rest upon said shelves until after the preceding article has been discharged from the shelves upon the wrapper in the recess below, said plate 97 being tilted on the return upper movement of the plunger by the latter coming in contact with the under edge of the cross bar 96.

In order to further assist and guide the wrapping paper as it is fed forward and to prevent the edges of the paper from curling up, I provide the plates 100, shown in top plan view (Figs. 2 and 5) and which are fastened to a folding plate 101 which is bent upon itself and is adapted to straddle the upper table 17, as shown clearly in Fig. 3 of the drawings. Said plate 101 is fastened to the horizontally and longitudinally movable plate 103 which is slotted at 104 to receive the screws 105 which are fastened to the plate 17 and serve to guide said plate 103 in its longitudinal movement. A lug $105^x$, projecting downward from the clip 106 and extending through a slot 107 in the plate 103, is disposed in the path of a cam wheel 108 which is fixed to the shaft 3 and which cam will cause a forward longitudinal movement to be imparted to the plate 103 at each revolution thereof. A coiled spring, designated by numeral 109, is fastened at one end to a hook upon the plate 103 and its other end is secured to the plate 17 and tends to return the plate 103 to its normal position after having been driven forward by the mechanism described.

The mechanism for severing the paper is shown in detail in Figs. 8 to 10 inclusive and consists of the knife 110 which is pivotally mounted upon a pin 111 carried by the standard 112, said knife being adapted to have a swinging movement in a slot 113 formed by the adjustable plates 114 and 115 which are held upon the top 17 by means of set screws 116 passing through transverse slots 118 formed in the plates 114 and 115. It will also be noted that the standard 112 is adjustably held upon the top 17 and adapted for slight adjustment as may be desired to suit different sized parcel. Fixed to the shaft 3 is a disk 119, an enlarged detail view of which is shown in Fig. 8 of the drawings, and which carries an antifriction roller 120 mounted upon a pin 121 projecting from the face thereof. A collar 122, integral with the disk 119, is provided with an indenture 123 in its circumference and which is adapted to engage a lug 124 upon the lever 125 at each revolution of said disk 119. The lever 125 is pivotally mounted upon a pin 126 carried by the lug 127 and its other end is pivotally and adjustably connected, through the medium of a pivotal pin 128, to a link 129 which in turn is pivotally connected at 130 to the shank portion of the knife 110. Said lever 125 is provided with a projection 131 upon the face thereof which is in the path of the antifriction roller 120 at each revolution of the disk, causing the lever to be depressed so that the lug 124 will engage the indenture formed in the boss of the disk and in the downward movement of the lever the knife will be caused to swing down between the adjacent edges into the slot 113 intermediate the adjustable plates 114 and 115. It will be understood that in operation the under edge of the lever 125 rides upon the circumference of the boss or integral collar 122 upon the disk 119 and that at each revolution of the boss, when the lug 124 comes opposite the indenture 123, the antifriction roller 120 will force the lever still downward, causing the projection to enter said indenture and which causes the knife to swing down and cut the paper and quickly return to its normal position, the return movement being caused by the inclined end of the indenture bearing against the inclined edge of the lug 124 in the further movement of the disk 119. By this operation, it will be noted that the knife will be swung back to its normal position and out of the way of the advancing wrapping paper.

The mechanism for forming the first fold to the wrapper and advancing the article, partially folded, forward to receive the other folds of the wrapper consists of a longitudinally movable member 132 which is mounted to have a sliding movement in the slotted bracket plates 133 fastened to the under side of the table top. Said member 132 has a forked end, one arm 134 of which has an angled cam projection 135 thereon, which is disposed in the path of an oval shaped cam projection 136 upon the face of the disk 137 fixed to the shaft 3 and which movement at each revolution of said disk 137 by contact with the cam 136 with the cam 135 will cause a longitudinal movement to be imparted to the member 132 in one direction toward the article to be wrapped. Projecting from the disk 137, on the face opposite the one from which the lug 136 extends, is a cam $137^a$ which is adapted at each revolution of the disk to contact with the end $135^a$ upon the arm $134^a$ to return the longitudinally movable bar 132 to its normal position after having been driven forward by the cam 136 coming in contact with the cam 135. A bar, designated by numeral 138, is held by means of a screw 139 to the arm 134 of said member 134 and also by a projecting portion $138^x$ to the bar 132 by means of an adjusting screw $138^y$, and has its other end bent at an angle and fastened to a plunger plate 140 adapted to advance the article being folded as it is receiving the initial fold of the end flaps. A second plate, designated by numeral 141, is recessed upon its under surface and slides over the plate 138 and is provided with a lug 142 upon its upper surface to which a link 143 is pivoted upon the pin 144, while its other end is pivotally connected to a pin 145 which in turn is pivotally connected to the upper end of a lever 146 which latter has adjustable pivotal connection at its lower end with a pin 148 mounted in one or another of the apertures 149 of the bracket plate 150. Said plate 141 has an upturned portion 151 to which the plates 153$^x$ are fastened by means of the screw 153$^y$ (shown clearly in Fig. 17) and which plates are bent to form end folding members 153 (shown clearly in Figs. 1 and 17 of the drawings). Said plates are adapted to be held nearer to or farther from each other accordingly as it may be desired to fold articles of different sizes. It will be understood that, by the particular construction shown and described for operating the plunger and members for folding the end flaps, said plunger and members start to move forward simultaneously but that in their forward movements the movement of the plate 141 will be accelerated and causing said members to fold the end flaps by the time the plunger has reached its farthest forward limit.

A plate 154 is adjustably fastened to the member 132, extending below the same, and is provided with an elongated curved and downwardly extending slot 155 through which a shaft 156 passes, carrying an anti-friction roller 157 which travels in said curved slot. Said shaft 156 is fastened at its ends to the curved bars 158 which in turn are pivotally connected to arms 159 of the angle levers 160, said angle bars being pivotally mounted upon the pins 161 which are fastened to the side walls 162 of the conduit upon the table through which the articles pass after being wrapped. Upon the arms 163 of said angle levers are mounted the top folding members 164 which, as shown in the drawings, have their inner faces parallel to each other and their under edges preferably rounded. Each of said arms 163 is bent as shown so as not to interfere with the projecting, partially folded flaps of a wrapper. Each wall of the conduit is provided with curved and inclined slots, designated by numeral 165, and which slots are adapted to receive and fold the last flap of the wrapper as the following, partially wrapped, article pushes the adjacent article forward into the conduit.

Springs, designated by numeral 170, have their forward ends bent about the forward ends of the side walls of the conduit and extend into the conduit a distance beyond the curved slots in the walls thereof, said springs being positioned a slight distance from the inner surface of the side walls and adapted to yield slightly as the articles are passing through the conduit. This yielding movement of the springs tends to press the folded flaps against the end of the article. Other springs, designated by numeral 171, are positioned along the inner faces of the side walls of the conduit and have contracted portions 172 which pass through slots 173 in said side walls and fastened in any suitable manner to the outer faces of the walls. Said springs 171 tend to hold the flaps folded until they pass out the exit end of the conduit. Horizontally disposed springs 177 have their forward ends fastened to the top of the conduit adjacent to the ends thereof and are adapted to bear against the upper wrapped faces of the articles as they are fed through the conduit.

In order to adapt the conduit to different size articles being wrapped, said side walls are made adjustable through the medium of the slotted angle plates 175$^x$ which are fastened to said walls and held by means of set screws 175 which pass through slots 176.

The operation of my apparatus will be readily understood, and is as follows:—The two wrapping papers will be fed forward between the rollers 4 and 5 by friction. When the forward edge of the wrapping paper advances beyond the forward edge of the extensible guide 53, the adjustable cams 108 will come in contact with the lug 105$^x$ and cause the plates 103 to be moved forward and with said plates 103 the folding plate 101 will be moved, the plates 100 guiding the forward edge of the wrapper and holding the same from curling up or wrinkling as they move forward together. In the further rotary movement of the operating shaft, the wrapper will be fed forward until it passes up between the inclined plate 57$^x$ and underneath the finger 57$^y$. When the wrapping paper has been fed forward, being measured to the proper length and which feeding is predetermined by the adjustment of the feeding rollers, the cam 108 will have passed by the lug 105$^x$ and the springs 109 will cause the plates 103 and the folding plate 101 fastened thereto to return to their starting position, the movements of the plates 100 being so adjusted that the latter will be out of the path of the article being wrapped and will be in position to hold the measured strip of paper while the same is being severed. It will be understood that the folding plate, in its forward movement, folds down the first vertical edge of the wrapper upon the article being folded as the plates 100 attached thereto are guiding the succeeding wrapper forward to its position to be wrapped about the following article. Before the wrapping paper is cut, the adjustable cam members will have come in contact with the antifriction roller upon the elbow and cause the friction roller 5 to rise from contact with the paper, causing the latter to come to rest, after which the antifriction roller 120 upon the disk 119 will come in contact with the cam projection 131 upon the lever 125 and cause the same to tilt down so that the lug 124 will engage the indenture 123 in the integral collar 122. This downward movement of the lever 125, which is pivotally connected to the knife, will cause the latter to swing down between the adjacent edges of the adjustable plates 114 and 115 upon the upper top 17. The moment the antifriction roller 120 passes by the cam projection 131, the lug 124 will be raised out of the indenture by the lugs coming in contact with the circumference of said integral collar and the knife will be quickly returned to its normal position and out of the path of the wrapping paper. Simultaneously with the returning of the knife to its normal position, the article to be wrapped, which has been fed to and rests upon the oppositely disposed shelves upon the rock shafts, will be allowed to be pushed down with the wrapping paper through the medium of the depressible plunger 63, this movement being effected through the medium of the connection of said plunger with the vertically movable bar 65 which has pivotal link connections with the lever 71, the latter being tilted by the antifriction roller 76 coming in contact with the hooked end 74 of one arm of said lever 71. As the bar 65 moves downward, the yoke 83 will lower sufficiently to allow the arms 88 to clear the pins 87 and which will cause the shafts 61 to rock and shelves turning down to vertical positions will allow the article to be wrapped to be depressed to its lowest position (Fig. 3). Said plates 65$^x$ will be limited in their downward movements by the pins 85 thereon coming in contact with the upper edge of the end wall 86 of the boxing. Simultaneously with the return movement of the depressible plunger, the plunger 140 starts forward, being operated by the cam 136 upon the disk 137 coming in contact with the inclined edge of the cam 135, causing a longitudinal movement to be imparted to the plate 132. The end folding members, designated by numeral 153, also start forward simultaneously with the forward movement of the plunger 140 and steadily gain upon the movement of the plunger 140 and will fold in the first vertical end flap by the time the members have reached their farthest limit and at which time the plunger 140 will have pushed the partially wrapped article from under the depressible plunger 63. As the article being wrapped is moved forward, the folding plate 101 will cause the first top flap to be folded over the top of the article, the opposite flap being folded down over the article as the latter is pushed underneath the spring plate 177 which bears down and holds the outer flap as the article, partially wrapped, is moved by the next succeeding article toward the conduit adjacent to the entrance of which the last flap is folded.

After a new wrapper has been fed forward to be folded about a following article, the operation is repeated, the series of articles with the wrappers about the same pushing one another forward into the conduit. As the first article comes in a certain position, the longitudinally movable plate 132 with the curved and inclined slot therein will have caused the angle levers carrying the end folding members to be thrown downward and the end folding members 164 will come in contact with and fold down the top overlapping flaps against the opposite ends of the article. A further forward movement of the article with the end top flap folded will cause the side flap to come in contact with the ends of the side walls of the conduit and fold the side flap against the end of the article and cause the vertical end flaps to be folded against the end of the article and which will leave the last flaps along the bottom to be folded up against the article. As the article with all its flaps, excepting the bottom one, folded enters the conduit, the end folded flap will be held against the end of the article with the vertically disposed spring plates adjacent to the side walls of the conduit and the bottom flaps as they enter the inclined slots in the side walls of the conduit, the article being pushed forward by a succeeding partially wrapped article, will come in contact with the inclined edges of the slots, the curvature of the edges of the latter causing the last flap to be folded up as it passes between the overlapping ends of the springs 170 and 171, which latter are vertically disposed and adjacent to the side walls of the conduit and coöperate with the horizontally disposed springs in the top of the conduit to hold the wrapper in its folded relation until it makes exit from the end of the latter where the articles are adapted to be discharged. As the depressible plunger 63 returns to its upper limit, the adjustable collar 64$^x$ upon the cross plate 64 will come in contact with the upper end of a slot in the yoke 83 and cause said yoke to move upward and, as the pins 87 thereon come in contact with the arms 88 which are fixed to the rock shafts, will cause the latter to rock back to their normal positions and with them the shelves which are fixed to the rock shafts will be thrown to horizontal positions, shown in Fig. 3, and in readiness to receive a succeeding article which may be fed through the chute 59. It will be noted that each article will be held from moving into position to be depressed by the plunger 63 by the angled end 98 of the plate 97, which angled end is raised out of the path of the article by the plunger 63 as it contacts with the under edge of the bar 96 which carries the plate 97, thus leaving the path unobstructed for the following article to slide down upon the shelves after the preceding article has been depressed and receives its wrapper.

It will be noted from the foregoing, taken in connection with the drawings, that the parts of the mechanism may be adjusted so that the machine may be adapted for wrapping articles of various sizes and the wrapping paper may be fed forward and measured off to predetermined lengths before it is severed by the knife, means being provided to prevent the wrapping paper curling up as it is fed forward to the position to receive the article to be wrapped.

In the event of it being desired to adjust the paper, it may be done when the paper is at rest and in which position the paper friction feeding roller 5 is raised from contact with the paper by end thrust imparted to the roller 31, which has a conical-shaped projection upon the end thereof which will come in contact with the edge of the recess in the bearing plate which holds the spindle end of said roller and which will cause the latter to frictionally engage the paper and allow the same to be moved forward and back for proper adjustment.

What I claim to be new is:—

1. An automatic apparatus for wrapping articles comprising a frame having a boxing to receive the article to be wrapped, tilting shelves for supporting the article to be wrapped within the boxing and over the wrapping paper, means for releasing the shelves to allow the same to tilt, mechanism for depressing the article with the wrapper to a position below said boxing, a knife for cutting the wrapper, a horizontally movable plunger positioned adjacent to the boxing as the article and wrapper are depressed, said plunger serving to cause the wrapper to fold against one side of the article, reciprocating means for folding one edge of the wrapper over the top of the article, mechanism underneath which the article thus partially wrapped is moved by said horizontally movable plunger, means for folding the vertical flaps upon one side of the article as the latter is moved by said horizontally movable plunger, movable members for folding the top flaps down against the ends of the article, a conduit, the side walls of which are adapted to fold the other vertical side flaps as the article is advanced, and means for folding the bottom flaps up against the ends of the article, as set forth.

2. An automatic apparatus for wrapping articles comprising a frame having a boxing to receive the article to be wrapped, tilting shelves within the boxing, a vertically movable plunger and means for moving the same against the upper surface of the article and depressing the latter with the wrapper underneath, a vertically movable yoke with projections thereon adapted to release said shelves to allow the article to be depressed with the wrapper underneath, said shelves being adapted to be returned to their normal positions as the vertically movable plunger returns to its starting position, reciprocating means for folding one edge of the wrapper over the top of the article, a horizontally movable plunger, a knife for cutting the wrapper, mechanism underneath which the article thus partially wrapped is moved by said horizontally movable plunger, means for folding the vertical flaps upon one side of the article as the latter is moved by said horizontally movable plunger, movable members for folding the top flaps down against the ends of the article, a conduit, the side walls of which are adapted to fold the other vertical side flaps as the article is advanced, and means for folding the bottom flaps up against the ends of the article, as set forth.

3. An automatic apparatus for wrapping articles comprising a frame having a boxing to receive the article to be wrapped, rock shafts journaled adjacent to the walls of the boxing, a knife for cutting the wrapper, a shelf projecting from each shaft, arms fixed to each shaft, a vertically reciprocating yoke, lugs projecting from the yoke and adapted to engage said arms to hold the shelves in horizontal positions within said boxing, a vertically movable plunger adapted to contact with the upper surface of the article and depress the latter with the wrapper underneath, reciprocating means for folding one edge of the wrapper over the top of the article, a horizontally movable plunger, mechanism underneath which the article thus partially wrapped is moved by said horizontally movable plunger, means for folding the vertical flaps upon one side of the article as the latter is moved by said horizontally movable plunger, movable members for folding the top flaps down against the ends of the article, a conduit, the side walls of which are adapted to fold the other vertical side flaps as the article is advanced, and means for folding the bottom flaps up against the ends of the article, as set forth.

4. An automatic apparatus for wrapping articles comprising a frame having a boxing to receive the articles to be wrapped, rock shafts journaled adjacent to the walls of the boxing, a knife for cutting the wrapper, a shelf projecting from each shaft, arms fixed to each shaft, a vertically movable plunger, a bar to which the same is fastened, a yoke supported by said bar and raised by the latter to its highest limit, means for preventing a lateral movement to the yoke, said vertically movable plunger adapted to contact with the upper surface of the article and depressing the latter with the wrapper underneath, reciprocating means for folding one edge of the wrapper over the top of the article, a horizontally movable plunger, mechanism underneath which the article thus partially wrapped is moved by said horizontally movable plunger, means for folding the vertical flaps upon one side of the article as the latter is moved by said horizontally movable plunger, movable members for folding the top flaps down against the ends of the article, a conduit, the side walls of which are adapted to fold the other vertical side flaps as the article is advanced, and means for folding the bottom flaps up against the ends of the article, as set forth.

5. An automatic apparatus for wrapping articles comprising a frame having a boxing to receive the article to be wrapped, rock shafts journaled adjacent to the walls of the boxing, a knife for cutting the wrapper, a shelf projecting from each shaft, arms fixed to each shaft, a vertically movable plunger, a bar to which the same is fastened, a yoke supported by said bar and raised by the latter to its highest limit, means for preventing a lateral movement to the yoke, means for holding the lower end of the yoke above the article being wrapped, a horizontally movable plunger, means for moving said vertically movable plunger to contact with and depress the article to a position in advance of said horizontally disposed plunger, reciprocating means for folding one edge of the wrapper over the top of the article, mechanism underneath which the article thus partially wrapped is moved by said horizontally movable plunger, means for folding the vertical flaps upon one side of the article as the latter is moved by said horizontally movable plunger, movable members for folding the top flaps down against the ends of the article, a conduit, the side walls of which are adapted to fold the other vertical side flaps as the article is advanced, and means for folding the bottom flaps up against the ends of the article, as set forth.

6. An automatic apparatus for wrapping articles comprising a frame having a boxing to receive the article to be wrapped, rock shafts journaled adjacent to the walls of the boxing, a knife for cutting the wrapper, a shelf projecting from each shaft, arms fixed to each shaft, a vertically movable bar having a lateral extension, a plunger upon the latter, a collar mounted upon said extension and having slots in the opposite faces thereof, a yoke guided in said slots and supported by the collar, projections upon the yoke adapted to engage said arms upon the rock shaft to support the shelves horizontally within the boxing, said vertically movable plunger adapted to contact with and depress the article, reciprocating means for folding one edge of the wrapper over the top of the article, a horizontally movable plunger mechanism underneath which the article thus partially wrapped is moved by said horizontally movable plunger, means for folding the vertical flaps upon one side of the article as the latter is moved by said horizontally movable plunger, movable members for folding the top flaps down against the ends of the article, a conduit, the side walls of which are adapted to fold the other vertical side flaps as the article is advanced, and means for folding the bottom flaps up against the ends of the article, as set forth.

7. An automatic apparatus for wrapping articles comprising a frame having a boxing to receive the article to be wrapped, rock shafts journaled adjacent to the walls of the boxing, a knife for cutting the wrapper, a shelf projecting from each shaft, arms fixed to each shaft, a vertically movable bar having a lateral extension, a plunger upon the latter, a collar mounted upon said extension and having slots in the opposite faces thereof, a yoke movable within said slots, a spring fastened to said extension to which the plunger is fastened and extending into the yoke and interposed between the yoke and said collar, said vertically movable plunger adapted to contact with and depress the article, reciprocating means for folding one edge of the wrapper over the top of the article, a horizontally movable plunger mechanism underneath which the article thus partially wrapped is moved by said horizontally movable plunger, means for folding the vertical flaps upon one side of the article as the latter is moved by said horizontally movable plunger, movable members for folding the top flaps down against the ends of the article, a conduit, the side walls of which are adapted to fold the other vertical side flaps as the article is advanced, and means for folding the bottom flap up against the ends of the article, as set forth.

8. An automatic apparatus for wrapping articles comprising a frame having a boxing to receive the article, tilting shelves attached to the boxing and designed to support an article therein, a horizontally movable plunger positioned adjacent to the boxing as the article and wrapper are depressed, a knife for cutting the wrapper, a vertical plunger movable within said boxing, means for allowing said shelves to tilt as the vertical plunger lowers against the upper surface of the article and causes the same to be depressed with the wrapping paper in the path of said horizontally movable plunger, a chute leading to said boxing, an angled plate, a rock shaft upon which said shaft is mounted, pivotal links for supporting the rock shaft, said angled plate adapted to rest upon the plunger and lower with the same and adapted to hold back a following article to be wrapped until after the vertical plunger has returned to its starting position, reciprocating means for folding one edge of the wrapper over the top of the article, mechanism underneath which the article thus partially wrapped is moved by said horizontally movable plunger, means for folding the vertical flaps upon one side of the article as the latter is moved by said horizontally movable plunger, movable members for folding the top flaps down against the ends of the article, a conduit, the side walls of which are adapted to fold the other vertical side flaps as the article is advanced, and means for folding the bottom flap up against the ends of the article, as set forth.

9. An automatic apparatus for wrapping articles comprising a frame having a boxing to receive the article, tilting shelves attached to the boxing and designed to support an article therein, a horizontally movable plunger positioned adjacent to the boxing as the article and wrapper are depressed, a knife for cutting the wrapper, a vertical plunger movable within said boxing, means for allowing said shelves to tilt as the vertical plunger lowers against the upper surface of the article and causes the same to be depressed with the wrapping paper in the path of said horizontally movable plunger, a chute leading to said boxing, an angled plate, a rock shaft, links upon which said rock shaft is mounted, a bar having angled ends mounted upon said rock shaft and to which said angled plate is fastened, supports upon which said links are pivotally mounted, said vertical plunger adapted to contact with and depress the article, reciprocating means for folding one edge of the wrapper over the top of the article, mechanism underneath which the article thus partially wrapped is moved by said horizontally movable plunger, means for folding the vertical flaps upon one side of the article as the latter is moved by said horizontally movable plunger, movable members for folding the top flaps down against the ends of the article, a conduit, the side walls of which are adapted to fold the other vertical side flaps as the article is advanced, and means for folding the bottom flap up against the ends of the article, as set forth.

10. An automatic apparatus for wrapping articles comprising a frame having a boxing to receive the article to be wrapped, means for feeding a strip of paper to a measured length underneath said boxing, a knife for cutting the wrapper, an inclined plate up which the forward end of the wrapper is fed, an integral finger upon said plate between which and the plate the paper is fed, reciprocating means for engaging the paper as it is fed forward, a vertically movable plunger, means for depressing an article temporarily supported within the boxing, a horizontally movable plunger adapted to cause one end of the wrapper to fold about the side of the article as it is depressed, means for folding one end of the wrapper over the top of the article before the article is moved forward from underneath the boxing, mechanism underneath which the article thus partially wrapped is moved by said horizontally movable plunger, reciprocating means for folding one edge of the wrapper over the top of the article, mechanism underneath which the article thus partially wrapped is moved by said horizontally movable plunger, means for folding the vertical flaps upon one side of the article as the latter is moved by said horizontally movable plunger, movable members for folding the top flaps down against the ends of the article, a conduit, the side walls of which are adapted to fold the other vertical side flaps as the article is advanced, and means for folding the bottom flaps up against the ends of the article, as set forth.

11. An automatic apparatus for wrapping articles comprising a frame, a rotatable shaft journaled therein, feed rollers fixed to said shaft, spring-pressed feeding rollers upon the frame, a vertically movable bar having a lateral extension, a plunger fixed to said extension, a tilting lever having pivotal link connections with said bar, a disk fixed to said shaft, an antifriction roller upon the disk adapted to contact with a hook upon said lever to cause the vertical plunger to be moved downward, positively operated mechanism for returning the lever to its normal position, a horizontally movable plunger, a reciprocating bar having a forked end to which said horizontally movable plunger is fixed, a disk having cam projections, one upon either side thereof and fixed to said shaft, one of the arms of the forked end of said bar having an inclined hooked end against which one of said cam projections is adapted to contact to impart a longitudinal movement in one direction to said bar, the other arm hooked for engagement with the cam projections upon the other side to return the lever to its starting position, means for feeding wrapping paper forward upon the frame, a boxing for the reception of the article to be wrapped and underneath which the wrapper is fed, means for cutting the paper, a reciprocating plate, a horizontally movable member connected to said reciprocating plate and adapted to fold one edge of the wrapper over the top of the article, means underneath which the partially wrapped article is adapted to be pushed to fold the opposite edge over the article, swinging arms and folding members carried thereby, means connected to said plate for actuating said arms, and a conduit with slotted walls into which the partially wrapped article is forced, as set forth.

12. An automatic apparatus for wrapping articles comprising a frame, a rotatable shaft journaled therein, feed rollers fixed to said shaft, spring-pressed feeding rollers upon the frame, a vertically movable bar having a lateral extension, a plunger fixed to said extension, a tilting lever having pivotal link connections with said bar, a disk fixed to said shaft, an antifriction roller upon the disk adapted to contact with a hook upon said lever to cause the vertical plunger to be moved downward, said lever having an offset with a notch therein, a cam upon said disk, a lug projecting therefrom, said pin designed to engage said notch and the end of the cam to contact with said offset to cause the lever to tilt back to its normal position, a horizontally movable plunger, a reciprocating bar having a forked end to which said horizontally movable plunger is fixed, a disk having cam projections, one upon either side thereof and fixed to said shaft, one of the arms of the forked end of said bar having an inclined hooked end against which one of said cam projections is adapted to contact to impart a longitudinal movement in one direction to said bar, the other arm hooked for engagement with the cam projections upon the other side to return the lever to its starting position, means for feeding wrapping paper forward upon the frame, a boxing for the reception of the article to be wrapped and underneath which the wrapper is fed, means for cutting the paper, a reciprocating plate, a horizontally movable member connected to said reciprocating plate and adapted to fold one edge of the wrapper over the top of the article, means underneath which the partially wrapped article is adapted to be pushed to fold the opposite edge over the article, swinging arms and folding members carried thereby, means connected to said plate for actuating said arms, and a conduit with slotted walls into which the partially wrapped article is forced, as set forth.

13. An automatic apparatus for wrapping articles comprising a frame, a rotatable shaft journaled therein, feed rollers fixed to said shaft, spring-pressed feeding rollers upon the frame, a vertically movable bar having a lateral extension, a plunger fixed to said extension, a tilting lever having pivotal link connections with said bar, a disk fixed to said shaft, an antifriction roller upon the disk adapted to contact with a hook upon said lever to cause the vertical plunger to be moved downward, positively operated mechanism for returning the lever to its normal position, a horizontally movable plunger, a reciprocating bar having a forked end to which said horizontally movable plunger is fixed, a disk having cam projections, one upon either side thereof and fixed to said shaft, one of the arms of the forked end of said bar having an inclined hooked end against which one of said cam projections is adapted to contact to impart a longitudinal movement in one direction to said bar, the other arm hooked for engagement with the cam projections upon the other side to return the lever to its starting position, means for feeding wrapping paper forward upon the frame, a boxing for the reception of the article to be wrapped and underneath which the wrapper is fed, means for cutting the paper, a reciprocating plate, a horizontally movable member connected to said reciprocating plate and adapted to fold one edge of the wrapper over the top of the article, means underneath which the partially wrapped article is adapted to be pushed to fold the opposite edge over the article, swinging arms and folding members carried thereby, pivotally mounted angle members upon the frame, end folding members secured to supporting arms of said angle members, a rod connected to the other arms, said reciprocating plate having a slotted extension through which said rod passes and forming means for tilting the angle members as the plate is reciprocated, as set forth.

14. An automatic apparatus for wrapping articles comprising a frame, a boxing in which the article to be wrapped is deposited, means for feeding wrapping paper underneath said boxing, a knife for cutting the wrapper, a vertically movable plunger and means for operating the same within said boxing, a reciprocating plate and means for operating the same, a horizontally movable plunger fixed to said reciprocating plate, a lever pivotally connected to said plate and to the frame, vertical flap folding members, pivotal link connections between the same and said pivotal lever, means for folding one end flap against the top of the article, means for folding the other edge flap against the top as it is moved by the horizontally actuated plunger from underneath the boxing, top folding members and connections between the same and said reciprocating plate, and a conduit with slotted walls into which the article is adapted to be pushed, as set forth.

15. An automatic apparatus for wrapping articles comprising a frame, a boxing in which the article to be wrapped is deposited, means for feeding wrapping paper underneath said boxing, a knife for cutting the wrapper, an operating shaft, a disk fixed thereto, a cam projection upon said disk, a plate adapted to fold an edge flap, a reciprocating bar fastened to said plate, paper guiding members upon said plate, a lug projecting from said bar and in the path of said plate, a spring fastened at one end to the bar and at the other to the frame, a vertically movable plunger for depressing the article and said wrapper, a horizontally movable plunger, means underneath which the article is pushed by said horizontally disposed plunger, top folding flaps, means for operating the same, and a conduit with slotted walls into which conduit the articles are pushed to fold the last flaps of the wrapper, as set forth.

In testimony whereof I hereunto affix my signature in presence of two witnesses.

JOHN H. FELMLEE.

Witnesses:
 F. S. BELT,
 FRANKLIN H. HOUGH.